United States Patent

Hung et al.

[11] Patent Number: 5,288,573
[45] Date of Patent: Feb. 22, 1994

[54] PHOTOCONDUCTIVE ELEMENTS WHICH ARE SENSITIVE TO NEAR-INFRARED RADIATION

[75] Inventors: Yann Hung; William Mey; Ralph H. Young, all of Rochester, N.Y.

[73] Assignee: Eastman Kodak Company, Rochester, N.Y.

[21] Appl. No.: 683,386

[22] Filed: Apr. 10, 1991

[51] Int. Cl.$^5$ ............... G03G 5/047; G03G 5/09
[52] U.S. Cl. ............................. 430/58; 430/57; 430/83
[58] Field of Search ............. 430/59, 78, 79, 134, 430/96, 83, 58, 59

[56] References Cited

U.S. PATENT DOCUMENTS

| | | |
|---|---|---|
| 3,614,414 | 10/1971 | Light . |
| 3,615,396 | 11/1971 | Gramza et al. . |
| 3,615,415 | 10/1971 | Gramza et al. . |
| 3,732,180 | 5/1973 | Gramza et al. . |
| 3,973,962 | 8/1976 | Contois et al. .......................... 96/1.6 |
| 3,997,342 | 12/1976 | Bailey . |
| 4,108,657 | 8/1978 | Mey ....................................... 96/1.6 |
| 4,175,960 | 11/1979 | Berwick et al. . |
| 4,329,416 | 5/1982 | Tanikawa et al. ................... 430/133 |
| 4,334,000 | 6/1982 | Chang . |
| 4,471,039 | 9/1984 | Borsenberger et al. . |
| 4,663,260 | 5/1987 | Kitatani et al. ....................... 430/83 |
| 4,666,802 | 5/1987 | Hung et al. . |
| 4,701,396 | 10/1987 | Hung et al. . |
| 4,865,934 | 9/1989 | Veda et al. ............................ 430/59 |
| 4,920,022 | 4/1990 | Sakakibara et al. .................. 430/59 |
| 4,990,422 | 2/1991 | Staudenmayer et al. . |
| 5,055,368 | 10/1991 | Nguyen et al. ....................... 430/78 |

FOREIGN PATENT DOCUMENTS 57-101845 12/1980 Japan .
63-14154 7/1986 Japan .
63-303362 6/1987 Japan .

*Primary Examiner*—Marion E. McCamish
*Assistant Examiner*—Rosemary Ashton
*Attorney, Agent, or Firm*—Robert L. Walker

[57] ABSTRACT

Photoconductive elements which have high sensitivity to radiation in the near-infrared region of the electromagnetic spectrum comprise a conductive support, a charge generation material which includes a near-infrared-sensitive organic pigment and, electrically contiguous with the charge generation material, an aggregate photoconductive material. A preferred embodiment is bimodal.

26 Claims, No Drawings

PHOTOCONDUCTIVE ELEMENTS WHICH ARE SENSITIVE TO NEAR-INFRARED RADIATION

FIELD OF THE INVENTION

This invention relates to electrophotography and, more particularly, to photoconductive elements which have high sensitivity to radiation in the near-infrared region of the electromagnetic spectrum.

BACKGROUND OF THE INVENTION

Photoconductive elements, also called photoreceptors, are composed of a conducting support and at least one photoconductive layer which is insulating in the dark but which becomes conductive upon exposure to actinic radiation. To form images, the surface of the element is electrostatically uniformly charged in the dark and then exposed to a pattern of actinic radiation. In areas where the photoconductive layer is irradiated, mobile charge carriers are generated which migrate to the surface and dissipate the surface charge in such areas. The resulting charge pattern on the surface is referred to as an electrostatic latent image. The latent image can be made visible by application of a liquid or dry developer containing finely divided charged toner particles which, if desired, can be transferred and fixed to another surface such as a sheet of paper.

Numerous photoconductive materials have been described as being useful in electrophotography. These include inorganic substances, such as selenium and zinc oxide, and organic compounds, both monomeric and polymeric, such as arylamines, arylmethanes, carbazoles, pyrroles, phthalocyanines and the like.

Photoconductive elements or photoreceptors can comprise single or multiple active layers. Those with multiple active layers (sometimes called multiactive elements or composite elements) have at least one charge-generation layer and at least one charge-transport layer. Under actinic radiation, the charge-generation layer generates mobile charge carriers and the charge-transport layer facilitates migration of the charge carriers to form the electrostatic latent image.

The majority of known photoconductors are sensitive to ultraviolet and visible electromagnetic radiation. However, increasing use is being made of diode lasers which emit radiation principally in the near-infrared region of the electromagnetic spectrum, i.e., from 700 nm to about 900 nm. Many photoconductors either have little or no sensitivity to such radiation, or they have other disadvantages. For example, they become increasingly conductive in the dark and lose their ability to hold an electrostatic charge (a process known as dark decay), or they have weak absorption of infrared radiation or poor quantum efficiency, both of which result in low electrophotographic sensitivity.

There is, therefore, a need for photoconductive elements sensitive to the near-infrared region of the electromagnetic spectrum and having low dark decay and improved sensitivity.

Borsenberger et al in U.S. Pat. No. 4,471,039 have disclosed that when the β-phase of a halogenated indium phthalocyanine pigment is used as the charge-generation layer in a multiactive electrophotographic element, the element has high sensitivity in the near-infrared region.

Hung et al in U.S. Pat. No. 4,666,802 have described a novel C-centered monoclinic bromoindium phthalocyanine pigment which is useful in the charge generation layer of a photoconductive element and which is sensitive to radiation in the near-infrared region of the spectrum.

A need exists for further improvement in the sensitivity of these and other photoconductive materials to infrared radiation as emitted, for example, by $Ga_xAl_{1-x}As$ diode lasers. A further need exists for such infrared sensitive materials which also have bimodal or bipolar sensitivity. A bipolar or bimodal electrophotographic element is an element that can discharge effectively either negative or positive surface potentials when exposed to electromagnetic radiation.

BRIEF SUMMARY OF THE INVENTION

The present invention provides an improvement in the infrared sensitivity of photoreceptors or photoconductors. It also provides electrophotographic elements which are bimodal.

The electrophotographic element of the invention comprises:

(a) an electrically conductive support, (b) a charge generation material comprising a near-infrared-sensitive organic pigment, and (c) electrically contiguous with said charge generation material, an aggregate photoconductive material comprising a continuous, electrically insulating polymer phase and dispersed therein a complex of (i) at least one polymer having an alkylidene diarylene group in a recurring unit and (ii) at least one pyrylium-type dye salt.

DETAILED DESCRIPTION

The term "aggregate photoconductive material" as used herein means a heterogeneous or aggregate photoconductive composition as disclosed in Light U.S. Pat. No. 3,615,414 and Gramza et al U.S. Pat. No. 3,732,180 which are incorporated herein by reference. As described in these patents, aggregate photoconductive compositions have a continuous electrically-insulating polymer phase containing a finely-divided, particulate co-crystalline complex of (i) at least one pyrylium-type dye salt and (ii) at least one polymer having an alkylidene diarylene group in a recurring unit.

The electrophotographic elements or photoreceptors of the invention can be multilayer or single layer elements. A multilayer element (also called a multiactive or a dual layer photoreceptor) has both a charge generation layer (CGL) and a charge transport layer (CTL) and these are electrically contiguous. The near-infrared-sensitive pigment will be in the charge generation layer. The aggregate material can be in either layer in the multilayer elements of the invention.

In a single layer element of the invention, a layer containing both the aggregate material and the pigment, which is a charge generation material, is coated on an electrically conductive support. In both the single layer and the multilayer embodiments, the near-infrared-sensitive pigment and the aggregate material are electrically contiguous.

In one embodiment of a multiactive electrophotographic element of the invention, an organic photoconductive charge generation layer which is near-infrared sensitive is coated on an electrically conductive support. Thereafter a charge transport material which is uniformly mixed with a dye-polymer aggregate material is coated as a layer over the charge generation layer. In this embodiment, as in the other possible embodiments of the invention, the aggregate material is electrically contiguous with the charge generation layer since it is coated with the charge transport layer, which itself is in contact with, i.e., electrically contiguous with, the charge generation layer.

In another configuration of the photoconductive element of the invention in which the aggregate material is electrically contiguous with the charge-generation layer, the charge-generating pigment and the aggregate material are mixed together in the charge-generation layer. In another configuration the pigment charge-generation layer is overcoated with a thin (e.g., 1-2 μm) aggregate layer, the aggregate material thus being electrically contiguous with the charge generation layer. In both of these latter configurations a charge transport layer which does not necessarily contain an aggregate material is also formed on the aggregate-containing layer.

Dye-polymer aggregates have been disclosed previously as charge generation layers in a multiactive element (U.S. Pat. No. 4,175,960) and as charge transport layers with an inorganic zinc oxide or selenium photoconductor (U.S. Pat. No. 4,108,657). It is believed, however, that they have not previously been suggested as a separate additive in a multiactive element having an organic pigment charge generation layer and it has not been recognized that when so incorporated they will enhance the infrared sensitivity of the element. This can be termed a supersensitization action and the aggregate material used as an addendum to the multiactive element can be called a supersensitizer. In the elements of this invention, an unexpected supersensitization is obtained for infrared exposure, which is actinic to the organic pigment charge-generation layer but to which the aggregate addendum is transparent.

Applicants have found that photoreceptors having a charge-generation layer containing a near-infrared-sensitive pigment and having electrically contiguous aggregate material (supersensitizer) offer unexpected improvements in photosensitivity to near infrared radiation. The new elements also afford advantages such as flexibility in adjusting the spectral response by proper selection of the charge-generation layer, capability of regeneration during repeated use and improved adhesion to the substrate. In addition, the multilayer embodiments of the invention wherein the aggregate material is mixed with the charge transport material of a charge transport layer possess the bimodal capability of either hole or electron transport by the charge transport layer.

In general, the infrared-sensitive, organic charge generation layer in the electrophotographic elements of the invention can comprise any organic photoconductor pigments having near-infrared sensitivity, i.e., sensitivity to radiation in the wave length range from about 700 to about 900 nm. Preferred pigments include a sublimed bromoindium phthalocyanine pigment, a dispersion coated C-centered monoclinic bromoindium phthalocyanine pigment as disclosed in Hung et al. U.S. Pat. No. 4,666,802, a β-phase indium phthalocyanine pigment as disclosed in U.S. Pat. No. 4,471,039 and a fluorine-substituted titanylphthalocyanine pigment, referred to hereinafter as [(4-F)$_4$Pc]TiO, as disclosed in U.S. Pat. No. 4,701,396, all of which patents are incorporated herein by reference. These preferred infrared sensitive photoconductors respond especially well to use with a dye-polymer aggregate composition in accordance with the invention.

When used with bromoindium phthalocyanine pigment in the charge generation layer, the dye-polymer aggregate material is especially effective for increasing the sensitivity to the radiation emitted by Ga$_x$Al$_{1-x}$As diode lasers. Since these lasers are more reliable, cheaper and more compact than gas lasers, there is a need for photoconductors which are sensitive in the near-infrared region where Ga$_x$Al$_{1-x}$As emits, and especially in the range from 700 to 900 nm. Photoconductive elements of the invention are especially useful for serving this need.

Other examples of useful infrared-sensitive pigments include chloroaluminum phthalocyanine, metal-free phthalocyanine, chloroindium phthalocyanine, chloroindium chlorophthalocyanine, vanadyl phthalocyanine and fluoro/methyl squaraine [Loutfy et al, Pure and Appl. Chem., 60, pp. 1047-1054 (1988)].

The photoconductive elements of the invention are used to make electrophotographic images, as in diode laser recording. In this method, the photoconductive element is electrostatically charged, e.g., by corona treatment, to a voltage, for example, of 500 to 600 volts negative or positive. Then it is exposed to a pattern of near-infrared radiation, causing charge to dissipate in the exposed regions. The resulting charge pattern on the photoconductive element is developed by contact with positively or negatively charged toner particles. Suitable developers include liquid and dry developers which are well known in the art. Such liquid developers comprise a dispersion of pigmented polymeric toner particles in a volatile insulating liquid such as an isoparaffinic hydrocarbon. Useful dry developers include both single component and two-component developers, the later comprising, for example, a mixture of magnetic carrier particles and powdered toner particles composed of a pigmented thermoplastic resin.

The aggregate compositions used in the photoreceptors can be prepared by several techniques, such as, for example, the "dye first" technique described in Gramza et al, U.S. Pat. No. 3,615,396, issued Oct. 26, 1971. Alternatively, they can be prepared by the "shearing" method described in Gramza, U.S. Pat. No. 3,615,415, issued Oct. 26, 1971. This latter method involves the high speed shearing of the photoconductive composition prior to coating and thus eliminates subsequent solvent treatment, as was disclosed in Light, U.S. Pat. No. 3,615,414 referred to above. By whatever method prepared, the aggregate composition is applied with a suitable liquid coating vehicle onto a support or underlying layer to form a separately identifiable multiphase aggregate composition, the heterogeneous nature of which is generally apparent when viewed under magnification, although such compositions may appear to be uniform to the naked eye in the absence of magnification. There can, of course, be macroscopic heterogeneity. Suitably, the pyrylium type dye-salt-containing aggregate in the discontinuous phase is finely-divided, i.e., typically predominantly in the size range of from about 0.01 to about 25 μm.

Pyrylium type dye salts, especially thiapyrylium and selenapyrylium dye salts, are useful in forming the aggregate compositions. Useful dyes are disclosed in Light, U.S. Pat. No. 3,615,414.

Particularly useful in forming the aggregates are pyrylium dye salts having the formula:

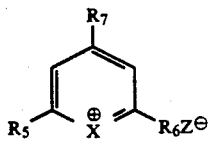

wherein:
$R_5$ and $R_6$ are phenyl groups;
$R_7$ is a dimethylamino-substituted phenyl group;
X is selenium, sulfur or tellurium; and
Z is an anion such as perchlorate, tetrafluoroborate or hexafluorophosphate.

The polymers useful in forming the aggregate compositions are electrically insulating, film-forming polymers having an alkylidene diarylene group in a recurring unit such as those linear polymers, disclosed in Light, U.S. Pat. No. 3,615,414 and Gramza et al, U.S. Pat. No. 3,732,180, incorporated herein by reference.

Preferred polymers for forming aggregate compositions are hydrophobic carbonate polymers containing the following group in a recurring unit:

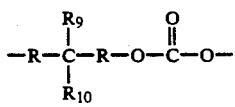

wherein each R is a phenylene group; and $R_9$ and $R_{10}$ are each methyl or, taken together, represent a norbornyl group. Such compositions are disclosed, for example, in U.S. Pat. Nos. 3,028,365 and 3,317,466. Especially preferred are polycarbonates prepared with bisphenol A. A wide range of film-forming polycarbonate resins are useful, with satisfactory results being obtained when using commercial polymeric materials which are characterized by an inherent viscosity of about 0.5 to about 1.8. Specific examples of useful polymers for the aggregate compositions are listed in Table I, Column 13 of U.S. Pat. No. 4,108,657, incorporated herein by reference.

The amount of the above-described pyrylium-type dye salt used in the aggregate photoconductive compositions described herein can vary considerably. Useful results are obtained by using the pyrylium-type dye salts in amounts of from about 0.001 to about 50 percent by weight of the aggregate photoconductive composition. Similarly, the amount of alkylidene diarylene group-containing polymer in the aggregate composition can vary considerably. Typically, the aggregate composition contains an amount of this polymer within the range of from about 20 to about 98 weight percent based on the weight of the aggregate composition, although larger or smaller amounts can be used.

The charge-transport layer in the multiactive photoconductive elements of the invention can comprise a charge-transporting organic polymer such as poly-N-vinylcarbazole or a solid solution of a charge-transporting organic monomer, for example, an aromatic amine such as tri-p-tolylamine, in an inert polymeric binder. Although the working examples herein illustrate specific charge transport materials, a wide range of charge transport materials can be used, including monomeric or polymeric or inorganic materials. They can be either p-type or n-type charge transport materials. Examples of the wide range of useful materials are disclosed in U.S. Pat. No. 4,701,396 which is incorporated herein by reference.

As indicated above, in one embodiment of the photoconductive element of this invention the aggregate material is blended uniformly with an organic charge-transporting material in the charge transport layer. In fact, this is a preferred embodiment of the invention because it has the valuable quality of bimodality. Charge transporting materials which are especially useful in this preferred embodiment are p-type or hole transporting materials, for example, triarylamines and amino-substituted polyarylalkanes. A preferred polymeric binder for the charge transporting material is bisphenol-A-polycarbonate. As the dye-polymer aggregate, a thiapyrylium dye, aggregated with a bisphenol-A-polycarbonate gives especially good results.

A photoreceptor is said to be bimodal if it can be charged and discharged effectively with both positive and negative surface potentials. Bimodal photoreceptors have the advantage that the same photoreceptor and the same developer can be used for either positive or negative reproductions of an original image. For example, when used with a developer containing positively charged toner particles, a positive surface potential produces a negative image (toner goes to the illuminated areas of the photoreceptor), whereas a negative surface potential produces a positive image (toner goes to unilluminated areas).

When a uniform electrical charge is applied to the surface of the photoreceptors and the charge-generation layer is subjected to an imagewise exposure by activating radiation, the charge generation layer generates charge carriers, i.e., electrons and holes, and injects carriers of at least one sign of charge into the charge-transport layer. The charge-transport layer then transports these charge carriers across the remainder of the element to form an electrostatic charge pattern corresponding to the imagewise exposure. For exposures incident on the charged surface it is preferable for the charge-transport layer to be substantially transparent to the activating near-infrared radiation, so that the imagewise exposure may readily pass through it to the charge-generation layer. When the exposure is through the substrate, however, the charge-transport layer need not be transparent.

The charge generation layer which contains the infrared sensitive pigments can have a thickness within a wide range depending upon the degree of photosensitivity desired. Thickness affects photosensitivity in two opposite ways. As thickness increases a greater proportion of actinic radiation is absorbed by the layer, but there is a greater likelihood of a charge carrier being trapped and thus not contributing to image formation. These two factors must be balanced in selecting an appropriate thickness. A thickness in the range from about 0.05 $\mu$m to 6.0 $\mu$m is preferred for maximum photosensitivity. At thicknesses much below 0.05 $\mu$m the radiation absorption is inadequate and at thicknesses much above 6.0 $\mu$m, the trapping of charge carriers becomes excessive.

It is advantageous to use a charge-transport layer which is thicker than the charge-generation layer, with best results generally being obtained when the charge-transport layer is from about 5 to about 400 times, and, particularly, 10 to 200 times, as thick as the charge-generation layer. However useful results can also be obtained using a charge-transport layer which is thinner than the charge-generation layer.

The invention is further illustrated by the following examples:

EXAMPLE 1

A sheet of nickel-coated poly(ethylene terephthalate) film support overcoated with an approximately 0.02 μm thick adhesive layer of poly[acrylonitrile-co-vinylidene chloride (15/85)] was used as a conductive support. A 0.15 μm thick charge-generation layer of bromoindium phthalocyanine (for synthesis, see U.S. Pat. No. 4,666,802) was deposited thereupon by vacuum sublimation from a resistance-heated tantalum boat at a rate of 20 Å/second. A 10 μm thick charge-transport layer containing the charge transport agent, 4,4'-benzylidene-bis-(N,N-diethyl-m-toluidine) (40%), bisphenol-A-polycarbonate (57%), and, as an aggregating dye, 4-(p-dimethylaminophenyl)-2,6-diphenylthiapyrylium hexafluorophosphate (3%) and a small amount of aggregate seed was coated over the charge-generation layer from a solution in a 60:40 mixture of dichloromethane and 1,1,2-trichloroethane. The bisphenol-A-polycarbonate was "Lexan 145" polymer, a product of General Electric Company. A transmission spectrum and a cross-section photomicrograph indicated that an aggregate material had formed in the charge transport layer.

The electrophotographic response of the resulting photoreceptor film was measured for low-intensity continuous exposure to radiation incident upon the corona-charged surface (500 volts) of the film. The electrophotographic sensitivities for both positive and negative surface charging were measured. Sensitivity is expressed herein as the energy density required to discharge the film from 500 to 100 volts. Also tested was a control film of the same composition except that the charge transport layer did not contain the aggregating dye. The film in accordance with the invention, containing the aggregate material in the charge-transport layer, exhibited high sensitivity for both positive and negative charging, requiring only about 5 ergs/cm$^2$ exposure at 800 nm even though the aggregate material is substantially transparent to 800 nm radiation. The control film exhibited no sensitivity for positive surface charging and a lesser sensitivity for negative charging relative to the multiactive elements containing an aggregate material in the charge-transport layer. The control film required an exposure of about 11 ergs/cm$^2$ at 800 nm.

A further unexpected result, was that the addition of the aggregate material to the charge transport layer resulted in significantly improved adhesion of the multiactive element to the support relative to the control film which did not contain an aggregate material in the charge-transport layer.

EXAMPLE 2

Elements were prepared as described above but an especially preferred compound, tri-p-tolylamine, was used as the charge-transport material in place of the toluidine compound. The multilayer film containing the aggregate supersensitizer in the charge-transport layer exhibited a sensitivity of about 4 ergs/cm$^2$ as compared to the 8 ergs/cm$^2$ sensitivity of the control film under the same conditions.

In a preferred embodiment of the invention a bromoindium phthalocyanine charge generation layer on a conductive support is overcoated with a charge transport layer. The latter is composed of (a) a solid solution of the charge transport material, 1,1-bis(4-di-p-tolylaminophenyl)cyclohexane (35%), in bisphenol-A-polycarbonate ("Lexan 145" resin) and (b) an aggregate of the thiapyrylium dye, 4-(p-dimethylaminophenyl)-2,6-diphenylthiapyrylium hexafluorophosphate with bisphenol-A-polycarbonate. The effect of the concentration of the thiapyrylium dye on the sensitivity of the photoreceptor is demonstrated by the following examples of a series of such photoreceptors.

EXAMPLES 3-7

Five photoreceptors of the indicated composition were prepared, the thickness of the charge generation layer in each being approximately 0.1 micron and the thickness of the charge transport layer being 10 microns. The concentration of the thiapyrylium dye in the five photoreceptors ranged from 1% to 5% by weight based on the total charge transport layer. Also prepared as a control was a sixth photoreceptor which was identical to the other five except that it contained no thiapyrylium dye in the charge transport layer.

The five photoreceptors containing the dye-polymer aggregate (Examples 3-7) and the control were tested by charging to −500 volts, exposing to near-infrared radiation (830 nm) and measuring the energy (ergs/cm$^2$) required to discharge the photoreceptor to −100 volts. The results are shown in the following table.

| Photoreceptor | Dye Concentration | Ergs/cm$^2$ at 830 nm (−500 V to −100 V) |
|---|---|---|
| Control | — | 9.6 |
| Examp. 3 | 1% | 4.2 |
| Examp. 4 | 2% | 5.0 |
| Examp. 5 | 3% | 5.2 |
| Examp. 6 | 4% | 5.0 |
| Examp. 7 | 5% | 7.1 |

These results show the reduction in energy required to discharge the photoreceptor when a dye-polymer aggregate is present and, hence, show sensitization by the aggregate. They also indicate an optimal dye concentration for negative charging in the range from 1 to 4% by weight of the charge transport layer. It is believed that the dye must be in the aggregated form to be a sensitizer. At a high dye concentration some dye may not aggregate with the polycarbonate resin.

The following examples describe preparation and comparative testing of photoconductive elements of the invention in which the infrared sensitive pigment layers are formed by dispersion coating instead of by sublimation as in Example 1.

EXAMPLE 8

A titanyl tetrafluorophthalocyanine pigment was made by the procedure of Example 1 of Hung et al U.S. Pat. No. 4,701,396 (incorporated herein by reference). A thin charge generation layer (~1.5 μm thickness) containing this pigment was then coated on a conductive support as in Example 3 of said Hung et al patent, except that the pigment layer was not overcoated with a thicker charge transport layer. Instead, a thin aggregate layer (~3 μm) containing 35 wt. % 1,1-bis(4-di-p-tolylaminophenyl)cyclohexane, 3 wt. % 4-(p-dimethylaminophenyl)-2,6-diphenylthiapyrylium hexafluorophosphate, bisphenol-A-polycarbonate and a small amount of aggregate seed was coated over the pigment layer. After drying, a charge transport layer (~12 μm) containing 20 wt. % 1,1-bis (4-di-p-tolylaminophenyl)cyclohexane, 20 wt. % tri-p-tolylamine and a polyester of 4,4'-(2-norbornylidene)diphenol with terephthalic acid and azelaic acid (60/40) was coated and dried.

A control photoconductive element was made for comparison in a similar manner except that the thiapyrylium-containing layer was omitted and the thickness of the charge transport layer was approximately 15 μm. When tested as in Examples 3-7, the sensitivity of the aggregate-containing element of Example 8 was about 7.7 ergs/cm$^2$ as compared to 8.6 ergs/cm$^2$ for the control under the same conditions.

EXAMPLE 9

A thin charge generation layer (~1.5 μm) made of bromoindium phthalocyanine pigment was coated on a conductive support, following the Photoconductive Element Example in Hung et al U.S. Pat. No. 4,666,802, incorporated herein by reference. A thin aggregate layer (~2 μm) containing 40% 1,1-bis(4-di-p-tolylaminophenyl) cyclohexane, 6.4% 4-(p-dimethylaminophenyl)-2, 6-diphenylthiapyrylium hexafluorophosphate and 53.6% bisphenol-A-polycarbonate and a small amount of aggregate seed was coated over the pigment layer. After drying, a charge transport layer (~10 μm) containing 20% 1,1-bis(4-di-p-tolylaminophenyl)cyclohexane, 20% tri-p-tolylamine, and a polyester of 4,4'-(2-norbornylidene)diphenol with terephthalic acid and azelaic acid (60/40) was coated and dried.

A control photoconductive element was made similarly, except that the aggregate-containing layer was omitted and the charge transport layer was approximately 14 μm thick. The aggregate-containing element exhibited a sensitivity of about 14.4 ergs/cm$^2$ as compared to 17.7 ergs/cm$^2$ for the control under the same conditions.

EXAMPLE 10

A thin charge generation layer of bromoindium phthalocyanine was made following Example 9 except that 8.0 g pigment, 0.2 g 4-(p-dimethylaminophenyl)-2,6-diphenylthiapyrylium hexafluorophosphate, 3.0 g tri-p-tolylamine, 4.2 g bisphenol-A-polycarbonate, and a small amount of aggregate seed were used. The charge transport layer (~12 μm) containing 20% 1,1-bis(4-di-p-tolylaminophenyl)cyclohexane, 20% tri-p-tolylamine, and a polyester of 4,4'-(2-norbornylidene)-diphenol with terephthalic acid and azelaic acid (60/40) was coated and dried.

A control photoconductive element was made similarly except that the first layer contained no thiapyrylium dye. The aggregate-containing element of Example 10 exhibited a sensitivity of about 13.4 ergs/cm$^2$ as compared to 14.4 ergs/cm$^2$ for the control under the same conditions.

Examples 1, 8, 9 and 10 refer to the use of aggregate seed in the coating of a layer containing aggregate material. This refers to the method of forming the aggregate material by mixing the aggregating components (e.g., polycarbonate and aggregating thiapyrylium dye) with a small amount of preformed aggregate to provide nucleating sites for aggregation of the layer. The preformed aggregate can be prepared by dissolving dyes and polycarbonates in a mixture of dichloromethane and 1,1,2-trichloroethane, followed by evaporation to dryness. Another suitable procedure is disclosed in the patent to Gramza, U.S. Pat. No. 3,615,415, incorporated herein by reference. See Example 3 thereof.

Examples 11 14 and 16 below are examples of the preparation of single layer electrophotographic elements of the invention. Examples 12, 13, 15 and 17 are comparative examples of single layer elements.

EXAMPLE 11

A phthalocyanine pigment dispersion was prepared by adding 6 g of [(4-F)$_4$Pc]TiO pigment and 3 g of "Lexan 145" polycarbonate in a container to 120 g dichloromethane and milling in a "Sweco" grinding mill for 2½ days. Then the dispersion was further diluted with an additional 60 g of dichloromethane.

A dye solution was prepared by dissolving 0.8 g of 4-(p-dimethylaminophenyl)2,6-diphenylthiapyrylium hexafluorophosphate and 0.2 g of 4-(p-dimethylaminophenyl)-2-(4-ethoxyphenyl)-6-phenylthiapyrylium fluoroborate, two aggregating dyes, in 262 g of the mixed solvent (dichloromethane/trichloroethane 70/30 by weight) in a container and stirring for 4 hours. Charge transport materials consisting of 8.0 g of 1,1-bis(4-di-p-tolylaminophenyl)cyclohexane, 7.7 g of tri-4-tolylamine and 0.3 g of 4,4'-bis(diethylamino)tetraphenylmethane were added to the container and stirring was continued for 0.5 hour. Then, 20.2 g of aggregating polycarbonate, "Lexan 145," and 1.6 g of poly(ethylene-co-neopentyl terephthalate), having a glycol molar ratio of 55:45, were added to the container and stirring was continued for at least 12 hours. Finally, 25.2 g of the phthalocyanine pigment dispersion was added to the container and stirring was continued to form a coating dope. The resulting coating dope was coated on a conductive support comprising a thin conductive layer of nickel on poly(ethyleneterephthalate) substrate to provide a photoconductive coating having a dry layer thickness of 12 micrometers.

EXAMPLE 12

(Comparative example; pigment omitted.)

The procedure of Example 11 was repeated except no phthalocyanine pigment dispersion was added. The resulting photoconductive coating had a dry layer thickness of 13 micrometers.

EXAMPLE 13

(Comparative example; no aggregate.)

The procedure of Example 11 was repeated except no aggregating dyes were added, an extra 1.0 g of "Lexan 145" polycarbonate being added to replace the amounts of the dyes.

The next example describes a single layer element of the invention in which a different pigment was used.

EXAMPLE 14

The procedure of Example 11 was repeated except the phthalocyanine pigment was replaced with titanyl phthalocyanine.

EXAMPLE 15

(Comparative example; no aggregate)

The procedure of Example 13 was repeated except the phthalocyanine pigment was replaced with titanyl phthalocyanine.

The next example is a single layer element of the invention with a different pigment.

EXAMPLE 16

The procedure of Example 11 was repeated except the phthalocyanine pigment was replaced with bromoindium phthalocyanine.

The next example is a comparative example with the pigment of Example 16 but omitting the aggregate.

EXAMPLE 17

(Comparative example; no aggregate.)

The procedure of Example 13 was repeated except the phthalocyanine pigment was replaced with bromoindium phthalocyanine.

Preparations of a series of additional dual layer elements are described in the following examples. Examples 18 and 21-23 illustrate the invention while Examples 19, 20 and 24 are comparative examples.

EXAMPLE 18

The charge generation layer (CGL) was prepared in a manner similar to the procedure of Example 11 but using different amounts of chemicals as follows:

| | |
|---|---|
| 4-(p-dimethylaminophenyl)-2,6-diphenylthiapyrylium hexafluorophosphate | 1.28 g |
| 4-(4-dimethylaminophenyl)-2-(4-ethoxyphenyl)-6-phenylthiapyrylium fluoroborate | 0.32 g |
| dichloromethane/trichloroethane = 70/30 by weight | 172.2 g |
| 1,1-bis(4-ditolylaminophenyl)cyclohexane | 4.0 g |
| tri-4-tolylamine | 3.85 g |
| 4,4'-bis(diethylamino)tetraphenylmethane | 0.15 g |
| "Lexan 145" polycarbonate | 8.1 g |
| Poly(ethylene-co-neopentyl (55:45 molar ratio) terephthalate) | 0.8 g |
| Phthalocyanine pigment dispersion | 31.5 g |

The resulting coating yielded a dry layer thickness of 4.5 micrometers for the charge generation layer. It was then overcoated with a charge transport layer dope solution comprising the following ingredients.

| | |
|---|---|
| Polyester of 4,4'-(2-norbornylidene)diphenol with 40/60 molar ratio of terephthalic/azelaic acids | 315 g |
| 1,1-bis(4-ditolylaminophenyl)cyclohexane | 105 g |
| tri-4-tolylamine | 101 g |
| 4,4'-bis(diethylamino)tetraphenylmethane | 4 g |
| dichloromethane/methyl acetate, 70/30 by weight | 4,725 g |

The total dry thickness of the charge generation layer and the charge transport layer was 24 micrometers.

EXAMPLE 19

(Comparative example; pigment omitted.)

The procedure of Example 18 was repeated except that no phthalocyanine pigment dispersion was added. The resulting photoconductive coating had a dry thickness of 24 micrometers including a CGL of 5.5 micrometers.

EXAMPLE 20

(Comparative example; no aggregate)

The procedure of Example 18 was repeated except no aggregating dyes were added. Extra "Lexan 145" polycarbonate was added to replace the amounts of the dyes. The resulting photoconductive coating had a dry thickness of 19 micrometers including 4 micrometers of CGL.

The next example illustrates a dual layer element of the invention with a different pigment.

EXAMPLE 21

The procedure of Example 18 was repeated except the phthalocyanine pigment was replaced with titanyl phthalocyanine.

EXAMPLE 22

The procedure of Example 20 was repeated except the phthalocyanine pigment was replaced with titanyl phthalocyanine.

The next example describes a dual layer element of the invention with a different pigment.

EXAMPLE 23

The procedure of Example 18 was repeated except the phthalocyanine pigment was replaced with bromoindium phthalocyanine.

EXAMPLE 24

(Comparative example; no aggregate.)

The procedure of Example 20 was repeated except the phthalocyanine pigment was replaced by bromoindium phthalocyanine.

The photoconductive elements prepared as in Examples 11-24 were subjected to comparative sensitometric tests. In each test the photoconductive element was charged to a uniform positive or negative potential, $V_o$ of around 500 V and exposed to radiation at 830 nm in the infrared region of the electromagnetic spectrum. The energy required in ergs/cm$^2$ to discharge the element to a negative or positive $V_o/2$ was calculated and is reported in the following table.

| EXAMPLE | Ergs/cm$^2$ at 830 nm | |
|---|---|---|
| | Negative | Positive |
| 11 | 5.0 | 4.1 |
| 12 | No Photodischarge | No Photodischarge |
| 13 | 6.4 | 5.7 |
| 14 | 4.6 | 5.3 |
| 15 | 11 | 12 |
| 16 | 14 | 19 |
| 17 | 27 | 32 |
| 18 | 3.3 | — |
| 19 | No Photodischarge | — |
| 20 | 4.8 | — |
| 21 | 5.0 | — |
| 22 | 7.4 | — |
| 23 | 18 | — |
| 24 | 27 | — |

With reference to the data in the above table, Example 12 shows that when the pigment was omitted, the single layer element did not discharge when exposed to 830 nm radiation. It was, thus, insensitive to this wavelength. A comparison of Examples 11 and 13 shows increased sensitivity at 830 nm when aggregate material was present with the pigment in the element of Example 11. Examples 14 and 15 provide a similar comparison with a different near-infrared sensitive pigment. Examples 16 and 17 likewise show that inclusion of the aggregate material, as in Example 16, increases the sensitivity of the near-infrared sensitive pigment.

In Examples 16 and 17 the bromoindium phthalocyanine pigment was milled and dispersion-coated instead of being vacuum deposited as in Example 1. Greater sensitivity was demonstrated by the vacuum deposited pigment. Nevertheless, in accordance with the invention, the sensitivity of the dispersion-coated pigment was further increased by incorporating aggregate material in the element. This is significant because the dispersion-coated pigment, although less sensitive is often less expensive to deposit than the sublimed pigment. Hence, the improvement in its sensitivity is valuable and is unexpected.

Examples 18 through 24 likewise show the unexpected advantages in a dual layer element of including the aggregate with the near-infrared sensitive pigment.

One of the advantages of the novel photoreceptors of the invention is that because of their sensitivity to radiation in the near-infrared region of the spectrum they can be used to record the radiation of diode lasers. They are not limited to that use, however. They can also include charge generation compounds having sensitivity, e.g., to visible light to provide photoconductive elements that have a broad range of sensitivity.

Although the examples have illustrated specific charge transport layer materials, the charge transport layer can be formed of any material, organic or inorganic, which can transport charge carriers generated in the charge generation layer. Most charge transport materials preferentially accept and transport either positive charge (holes) or negative charges (electrons), although materials are known which will transport both positive and negative charges. Transport materials with a preference for conduction of positive charge carriers are called p-type transport materials and those with a preference for conduction of negative charges are called n-type.

Examples of useful p-type and n-type charge transport materials are disclosed, for example, in U.S. Pat. No. 4,666,802, incorporated herein by reference. Preferred p-type charge transport materials are triarylamines such as tri-p-tolylamine and amino-substituted polyarylalkane photoconductors represented by the formula;

wherein D and G, which may be the same or different, represent aryl groups and J and E, which may be the same or different, represent a hydrogen atom, an alkyl group, or an aryl group, at least one of D, E and G containing an amino substituent. Especially useful is a polyarylalkane wherein J and E represent a hydrogen atom, an aryl, or an alkyl group and D and G represent substituted aryl groups having as a substituent thereof a diaryl amino group wherein the aryl groups are unsubstituted aryl groups such as phenyl or alkyl-substituted aryls such as a tolyl. Additional information concerning certain of these latter polyarylalkanes may be found in Rule et al U.S. Pat. No. 4,127,412. An example of such a compound is the cyclohexane derivative disclosed in Example 8 above.

Useful n-type charge transport materials include 2,4,7-trinitro-9-fluorenone and complexes thereof with poly(vinyl carbazole). Others include 4H-thiopyran-1,1-dioxides (U.S. Pat. No. 4,514,481); fluorenylidene methane derivatives (U.S. Pat. No. 4,559,287); N-cyanoimine derivatives of quinones (U.S. Pat. No. 4,913,996); naphthoquinone derivatives, (U.S. Pat. Nos. 4,869,984; 4,909,966; 4,921,637; and 4,869,985); 7-nitro-2-aza-9-fluorenylidene malononitrile (U.S. Pat. No. 4,135,928); and diphenoquinone derivatives (Y. Yamaguchi et al., J. Chem. Soc. Chem. Commun. 1990, 222).

A single charge transport layer or more than one can be employed. Where a single charge transport layer is employed it can be of either a p-type or an n-type material.

When solvent coating the layers, a film-forming polymeric binder can be employed. The binder may, if it is electrically insulating, help to provide the element with electrical insulating characteristics. It also is useful (a) in coating the layer, (b) in adhering the layer to an adjacent layer, and (c) when it is a top layer, in providing a smooth, easy to clean, wear resistant surface.

When a polymeric binder is employed in either the charge generation or charge transport layer, the optimum ratio of charge generation or charge transport material to binder may vary widely depending on the particular binder and charge transport materials. In general, useful results are obtained when the amount of active charge generation or charge transport material contained within the layer varies within the range of from about 2 to about 90 percent based on the dry weight of the layer.

Representative materials which may be employed as binders in the charge generation and charge transport layers are film-forming polymers having a fairly high dielectric strength and good electrically insulating properties. Such binders include, for example, styrene-butadiene copolymers; vinyltoluene-styrene copolymers; styrene-alkyd resins; silicone-alkyd resins; soya-alkyd resins; vinylidene chloride-vinyl chloride copolymers; poly(vinylidene chloride); vinylidene chloride acrylonitrile copolymers; vinyl acetate vinyl chloride copolymers; poly(vinyl acetals), such as poly(vinyl butyral); nitrated polystyrene; polymethylstyrene; isobutylene polymers; polyesters, such as a poly[ethylene-co-alkylenebis(alkyleneoxyaryl) phenylenedicarboxylate]; phenolformaldehyde resins; ketone resins; polyamides; polycarbonates; polythiocarbonates; poly[ethylene-co-isopropylidene-2,2-bis(ethyleneoxyphenylene) terephthalate]; copolymers of vinyl haloacrylates and vinyl acetate such as PolY(vinyl-m-bromobenzoate-co-vinyl acetate); and chlorinated polyolefins, such as chlorinated poly(ethylene).

Binder polymers should provide little or no interference with the transport of charge carriers through the layer. Examples of binder polymers which are especially useful in p-type charge transport layers include styrene-containing polymers, bisphenol A polycarbonates, phenol-formaldehyde resins, polyesters such as poly[ethylene-co-isopropylidene-2,2-bis (ethyleneoxyphenylene)]terephthalate, and copolymers of vinyl haloacrylates and vinylacetate such as poly(vinyl-m-bromobenzoate-co-vinyl acetate).

The charge generation and charge transport layers can also contain other addenda such as leveling agents, surfactants and plasticizers to enhance or improve various physical properties of the layer. In addition, various addenda to modify the electrophotographic response of the element can be incorporated in the charge transport layer. For example, contrast control materials, such as certain hole-trapping agents and certain easily oxidized dyes can be incorporated. Such contrast control materials are described in Research Disclosure, Vol. 122, June 1974, p. 33, in an article entitled "Additives For Contrast Control in Organic Photoconductor Compositions and Elements."

When the charge generation layer or the charge transport layer is solvent coated, the components are dissolved or dispersed in a liquid together with the binder, if one is employed, and other addenda. Useful liquids include aromatic hydrocarbons such as benzene, naphthalene, toluene, xylene and mesitylene; ketones such as acetone and butanone; halogenated hydrocarbons such as methylene chloride, chloroform and ethylene chloride; ethers including ethyl ether and cyclic ethers such as tetrahydrofuran; and mixtures thereof.

A variety of electrically conducting supports in the form of sheets, drums or endless belts can be employed in the elements of this invention, such as for example, paper (at a relative humidity above 20 percent); aluminum-paper laminates; metal foils such as aluminum foil, zinc foil, etc.; metal plates such as aluminum, copper, zinc, brass and galvanized plates; vapor deposited metal layers such as silver, chromium, nickel, aluminum and the like coated on paper or conventional photographic film bases such as poly(ethylene terephthalate), cellulose acetate, etc. Such conducting materials as chromium nickel, etc. can be vacuum deposited on transparent film supports in sufficiently thin layers to allow electrophotographic elements prepared therewith to be exposed from either side. An especially useful conducting support can be prepared by coating a support material such as poly(ethylene terephthalate) with a conducting layer containing a semiconductor dispersed in a resin. Such conducting layers both with and without electrical barrier layers are described in U.S. Pat. No. 3,245,833 by Trevoy, issued Apr. 12, 1966.

The various layers of the element can be coated directly on the conducting substrate. In some cases, it may be desirable to use one or more intermediate subbing layers over the conducting substrate to improve adhesion between the conducting substrate and overlying layers or to act as an electrical barrier layer as described in Dessauer U.S. Pat. No. 2,940,348. Such subbing layers, if used, typically have a dry thickness in the range of about 0.01 to about 5 $\mu$m. Typical subbing layer materials include film-forming polymers such as cellulose nitrate, polyesters, copolymers of poly(vinyl pyrrolidone) and vinylacetate, and various vinylidene chloride-containing polymers including two, three and four component polymers prepared from a polymerizable blend of monomers or prepolymers containing at least 60 percent by weight of vinylidene chloride. Representative vinylidene chloride-containing polymers include vinylidene chloride-methyl methacrylate-itaconic acid terpolymers as disclosed in U.S. Pat. No. 3,143,421. Various vinylidene chloride-containing hydrosol polymers which may be used include tetrapolymers of vinylidene chloride, methyl acrylate, acrylonitrile and acrylic acid as disclosed in U.S. Pat. No. 3,640,708. Other useful vinylidene chloride-containing copolymers include poly(vinylidene chloride-methyl acrylate), poly(vinylidene chloride-methacrylonitrile), poly-(vinylidene chloride-acrylonitrile), and poly-(vinylidene chloride-acrylonitrile-methyl acrylate). Other subbing materials include the so-called tergels described in Nadeau U.S. Pat. No. 3,228,770.

Optional overcoat layers can also be used if desired. For example, to improve surface hardness and resistance to abrasion, the surface of the element of the invention can be coated with one or more electrically insulating, organic polymer coatings or electrically insulating, inorganic coatings. Useful overcoats are described for example, in *Research Disclosure*, "Electrophotographic Elements, Materials and Processes", Vol. 109, p. 63, Paragraph V, May 1973.

While the novel photoconductive elements are useful in electrophotography, they can also be used in other arts, such as in solar cells, where photoconductive elements are employed.

This invention has been described in detail with certain preferred embodiments thereof, but it will be understood that variations and modifications can be effected within the spirit and scope of the invention.

We claim:

1. An electrophotographic element which comprises:
   (a) an electrically conductive support,
   (b) a charge generation material comprising a near-infrared-sensitive organic pigment,
   (c) an aggregate photoconductive material comprising a continuous, electrically insulating polymer phase and heterogeneously dispersed therein a cocrystalline complex of (i) at least one polymer having an alkylidene diarylene group in a recurring unit and (ii) at least one pyrylium dye salt, said organic pigment being admixed in a layer with said aggregate photoconductive material or being present in a separate layer in contact with a layer containing said aggregate photoconductive material, said separate layer having a thickness in the range from about 0.05 $\mu$m to 6.0 $\mu$m.

2. An element according to claim 1 wherein the pigment is a titanium phthalocyanine pigment.

3. An element according to claim 1 wherein said pigment is a titanium phthalocyanine pigment having fluorine ring substitution.

4. An element according to claim 3 wherein the pigment comprises a titanyl tetrafluorophthalocyanine.

5. An element according to claim 1 wherein the pigment is a bromoindium phthalocyanine pigment.

6. An element according to claim 5 wherein the pigment is deposited on the support by vacuum sublimation.

7. An element according to claim 1 wherein the aggregate material comprises a thiapyrylium dye aggregated with a bisphenol-A-polycarbonate.

8. An element according to claim 1 wherein said organic pigment is admixed with said aggregate photoconductive material.

9. A multiactive electrophotographic element which comprises:
   (a) an electrically conductive support,
   (b) a charge generation layer containing a near-infrared-sensitive organic pigment,
   (c) a charge transport layer and,
   (d) an aggregate photoconductive material comprising a continuous, electrically insulating polymer phase and heterogeneously dispersed therein a cocrystalline complex of (i) at least one polymer having an alkylidene diarylene group in a recurring unit and (ii) at least one pyrylium dye salt, said organic pigment being admixed in a layer with said aggregate photoconductive material or being present in a separate layer in contact with a layer containing said aggregate photoconductive material, said separate layer having a thickness in the range from about 0.05 $\mu$m to 6.0 $\mu$m.

10. An element according to claim 9 wherein is a bromoindium phthalocyanine pigment.

11. An element according to claim 10 wherein the pigment is deposited by vacuum sublimation.

12. An element according to claim 9 wherein the pigment is a titanium phthalocyanine pigment having fluorine ring substitution.

13. An element according to claim 12 wherein the pigment comprises a titanyl tetrafluorophthalocyanine.

14. An element according to claim 9 wherein the aggregate material comprises a thiapyrylium dye aggregated with a bisphenol-A-polycarbonate.

15. An element according to claim 14 wherein the aggregate material and an organic charge transport material are present in the charge transport layer, said element being bimodal.

16. An element according to claim 15 wherein the charge transport material is a hole transporting material.

17. An element according to claim 15 wherein the charge transport layer contains a charge transport material selected from the group consisting of triarylamines and amino-substituted polyarylalkanes.

18. An element according to claim 17 wherein the dye is 4-(p-dimethylaminophenyl)-2,6-diphenyl-thiapyrylium hexafluorophosphate, perchlorate or tetrafluoroborate.

19. An element according to claim 17 wherein the concentration of thiapyrylium dye in the charge transport layer is from about 1 to about 4 weight percent based on the total weight of the layer.

20. an element according to claim 9 wherein said organic pigment is admixed with said aggregate photoconductive material.

21. A bimodal electrophotographic element comprising
(a) an electrically conductive support,
(b) a charge generation layer containing an organic pigment which absorbs radiation in the wavelength range from 700 to 900 nm, said charge generation layer having a thickness in the range from about 0.05 μm to 6.0 μm, and
(c) electrically contiguous with said charge generation layer a charge transport layer which contains an organic charge transport material and an aggregate photoconductive material comprising a continuous, electrically insulating polymer phase and heterogeneously dispersed therein a co-crystalline complex of (i) at least one polymer having an alkylidene diarylene group in a recurring unit and (ii) at least one pyrylium dye salt.

22. An element according to claim 21 wherein said pigment is a sublimed phthalocyanine pigment.

23. An element according to claim 21 wherein said pigment is a dispersion-coated phthalocyanine pigment.

24. A method of electrophotographic imaging utilizing near-infrared radiation, comprising the steps of:
(a) charging the surface of an electrophotographic element, said element comprising:
an electrically conductive support,
a charge generation material comprising a near-infrared-sensitive organic pigment, and
an aggregate photographic material comprising a continuous, electrically insulating polymer phase and heterogeneously dispersed therein a co-crystalline complex of (i) at least one polymer having an alkylidene diarylene group in a recurring unit and (ii) at least one pyrylium dye salt, said organic pigment being admixed in a layer with said aggregate photoconductive material or being present in a separate layer in contact with a layer containing said aggregate photoconductive material, said separate layer having a thickness in the range from about 0.05 μm to 6.0 μm,
(b) exposing said element to actinic radiation, including near-infrared radiation, to form an electrostatic latent image,
(c) developing the charged and exposed element by applying charged toner particles to said element to produce a toned image.

25. A method according to claim 24 wherein said actinic radiation is predominantly near-infrared radiation.

26. A method according to claim 25 wherein said actinic radiation is infrared radiation emitted by a $Ga_xAl_{1-x}As$ diode layer.

* * * * *